US012311922B2

(12) United States Patent
Lange et al.

(10) Patent No.: US 12,311,922 B2
(45) Date of Patent: May 27, 2025

(54) METHOD FOR REMOVING USER-SPECIFIC AND/OR DRIVE-SPECIFIC USER DATA IN A MOTOR VEHICLE, AND CORRESPONDING MOTOR VEHICLE

(71) Applicant: Volkswagen Aktiengesellschaft, Wolfsburg (DE)

(72) Inventors: Klaus Lange, Braunschweig (DE); Christoph Hoffmann, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 255 days.

(21) Appl. No.: 17/610,585

(22) PCT Filed: May 13, 2020

(86) PCT No.: PCT/EP2020/063245
§ 371 (c)(1),
(2) Date: Nov. 11, 2021

(87) PCT Pub. No.: WO2020/229500
PCT Pub. Date: Nov. 19, 2020

(65) Prior Publication Data
US 2022/0234574 A1    Jul. 28, 2022

(30) Foreign Application Priority Data
May 15, 2019   (DE) .................... 10 2019 207 074.4

(51) Int. Cl.
*B60W 30/08*    (2012.01)
*B60W 50/14*    (2020.01)
(Continued)

(52) U.S. Cl.
CPC ............ *B60W 30/08* (2013.01); *B60W 50/14* (2013.01); *B62D 15/021* (2013.01); *B60W 2050/146* (2013.01)

(58) Field of Classification Search
CPC ................. B60W 30/08; B60W 50/14; B60W 2050/146; B62D 15/021; G06F 3/067;
(Continued)

(56) References Cited

U.S. PATENT DOCUMENTS

| 10,358,116 B1 * | 7/2019 | Jayaraman ............ H04L 67/306 |
| 2011/0076943 A1 * | 3/2011 | Chang ..................... H04L 69/18 |
| | | 455/41.1 |

(Continued)

FOREIGN PATENT DOCUMENTS

| CN | 107407976 A | 11/2017 | ............. B60K 37/06 |
| DE | 102019207074 A1 | 11/2020 | ............... G07C 7/00 |

(Continued)

OTHER PUBLICATIONS

Data Storage Device of a Vehicle (Year: 2018).*

(Continued)

*Primary Examiner* — Thomas E Worden
*Assistant Examiner* — Atticus A Cameron
(74) *Attorney, Agent, or Firm* — Slayden Grubert Beard PLLC

(57) ABSTRACT

The invention relates to a method for removing user-specific and/or drive-specific user data which are saved distributedly on multiple controllers in a motor vehicle. A trigger apparatus is provided, and the trigger apparatus checks whether a trigger condition has been satisfied. If the trigger condition has been satisfied, a specified common delete command is transmitted to the plurality of controllers of the motor vehicle via a data bus of the motor vehicle, and each controller carries out a specified delete routine if the con- (Continued)

troller has received the delete command from the data bus, said delete routine being used to overwrite and/or delete user data saved on the particular controller.

20 Claims, 2 Drawing Sheets

(51) Int. Cl.
  *B62D 15/02* (2006.01)
  *G06F 3/06* (2006.01)
  *G06F 21/62* (2013.01)
  *G06F 21/78* (2013.01)

(58) Field of Classification Search
  CPC .. G06F 3/0608; G06F 3/0652; G06F 21/6245; G06F 21/78; G06F 2221/2143
  See application file for complete search history.

(56) References Cited

U.S. PATENT DOCUMENTS

| | | | | |
|---|---|---|---|---|
| 2013/0117857 | A1* | 5/2013 | Zimmermann | G07C 5/008 726/27 |
| 2013/0159230 | A1* | 6/2013 | Weir | G01C 21/3617 706/20 |
| 2016/0013945 | A1* | 1/2016 | Offenberg | G06F 21/64 713/176 |
| 2016/0191704 | A1 | 6/2016 | Macinnes et al. | 455/411 |
| 2016/0253348 | A1* | 9/2016 | Mauti, Jr. | G06F 16/17 707/692 |
| 2018/0050592 | A1 | 2/2018 | Bouaziz et al. | |
| 2019/0089807 | A1 | 3/2019 | Ahmed | |
| 2020/0043254 | A1* | 2/2020 | Hase | B60W 40/08 |
| 2020/0098049 | A1* | 3/2020 | Jack | G06F 21/6245 |

FOREIGN PATENT DOCUMENTS

| | | | |
|---|---|---|---|
| SE | 1750416 A1 | 1/2018 | G06F 21/62 |
| WO | 2020/229500 A1 | 11/2020 | G06F 21/62 |

OTHER PUBLICATIONS

German Office Action, Application No. 102019207074.4, 6 pages.
International Search Report and Written Opinion, Application No. PCT/EP2020/063245, 9 pages.
Chinese Office Action, Application No. 202080036192.5, 14 pages.
European Office Action, Application No. 20729641.9, 10 pages.

* cited by examiner

METHOD FOR REMOVING USER-SPECIFIC AND/OR DRIVE-SPECIFIC USER DATA IN A MOTOR VEHICLE, AND CORRESPONDING MOTOR VEHICLE

CROSS-REFERENCE TO RELATED APPLICATIONS

This application claims priority to German Patent Application No. DE 10 2019 207 074.4, filed on May 15, 2019 with the German Patent and Trademark Office. The contents of the aforesaid Patent Application are incorporated herein for all purposes.

TECHNICAL FIELD

The invention relates to a method for removing user-specific and/or drive-specific user data that are distributed on multiple controllers in a motor vehicle, i.e., saved in a decentralized manner. The invention also includes a motor vehicle that may perform the method according to the invention.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In a motor vehicle, one may be interested in rendering the saving of data in controllers controllable for a user. In the context of the European GDPR (General Data Protection Regulation), it may for example be of interest to allow a user to delete user-specific data relating to him that are saved in the motor vehicle in one or more controllers. Drive-specific data as well, for example data relating to friction coefficients of different road sections, may permit an inference of potential whereabouts of a user, which is why a user may also be interested in deleting such data.

Previously, the resetting of data has only been known in individual media or assistance-related devices such as for example an infotainment system (information entertainment system) or in smart phones in order to delete for example the telephone numbers therein of received calls and/or sent calls. Contrastingly, in order to delete all personal and/or drive-related user data in a motor vehicle, a workshop visit would be needed in order, by a re-initialization of every controller that has recorded and saved data during the operation of the motor vehicle, to remove data therefrom.

Instead, it is however desired to give the driver himself, or generally a user or keeper of a motor vehicle, the option of resetting all controllers of his motor vehicle, for example to a factory setting without a workshop visit so that a user of the motor vehicle retains the full control of his user data and/or driving data when for example the motor vehicle is passed on to someone else in order for example to lend or sell the motor vehicle.

SUMMARY

A need exists to give a user control of user data in a motor vehicle that are saved distributedly on multiple controllers.

The need is addressed by the subject matter of the independent claims. Embodiments of the invention are described in the dependent claims, the following description, and the drawings.

DESCRIPTION

Figure 1:
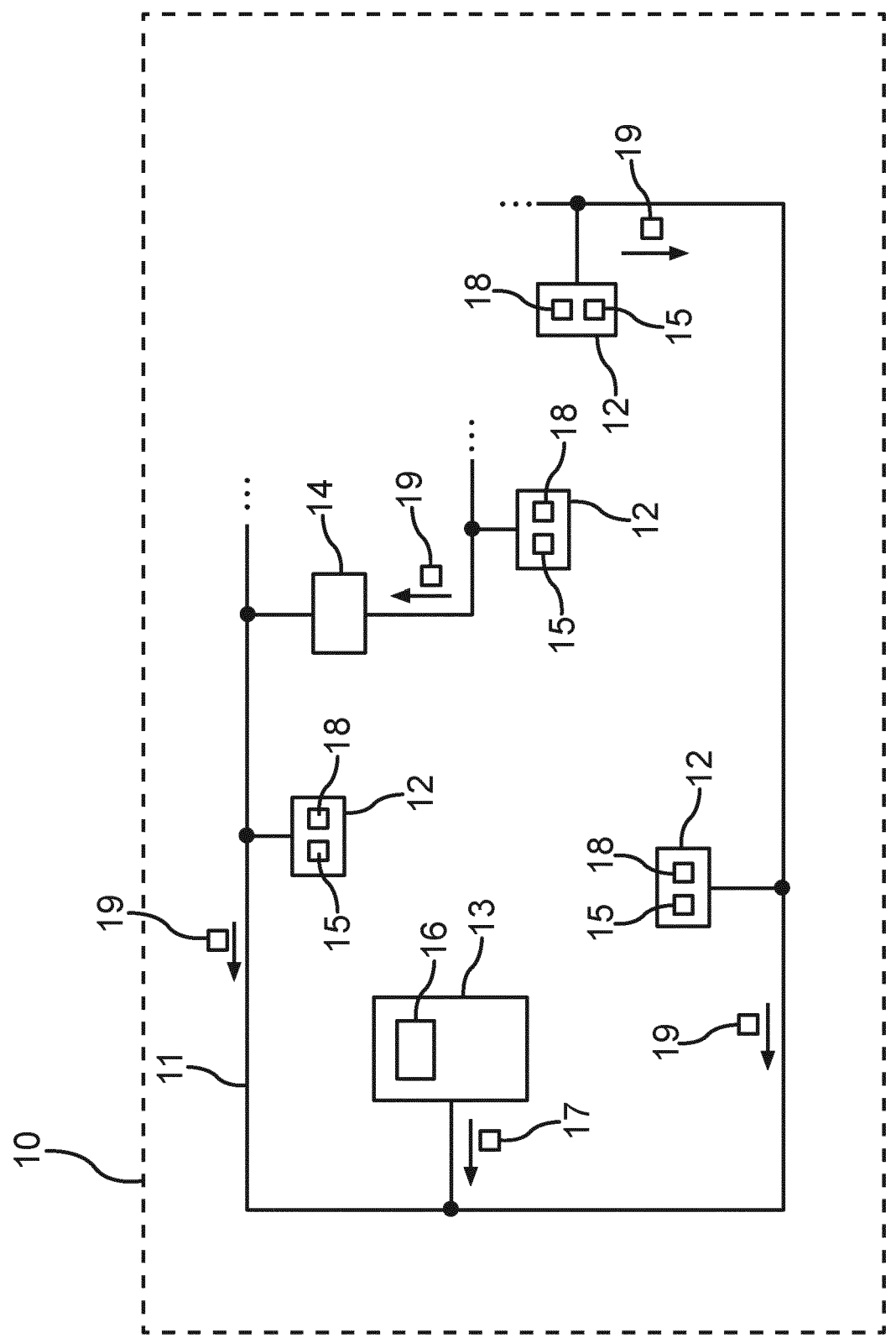
FIG. 1 shows a schematic representation of an embodiment of a motor vehicle.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first exemplary aspect provides a method for removing user-specific and/or drive-specific user data. The method is based on the fact that these user data are saved distributedly on multiple controllers in a motor vehicle. Whereas user-specific user data are directly assigned to a user, or a user identity or user group, "drive-specific user data" means that an indirect inference of at least one person is possible with drive-specific user data since the drive data describe a course of at least one drive and, by using the knowledge about the particular driver and/or vehicle passengers during the drive, information is also provided about the whereabouts of at least one person.

In the method, a trigger apparatus is provided in the motor vehicle that checks whether a trigger condition has been satisfied. If the trigger condition has been satisfied, a specified common delete command is transmitted by the trigger apparatus via a data bus of the motor vehicle to the plurality of controllers of the motor vehicle. In other words, it is ensured that the plurality of controllers to which the user data are distributed, all react to the same delete command, which is why it is termed a "common delete command". Accordingly, sending the delete command as a so-called broadcast command to the controllers via the data bus allows all of these controllers to be controlled with only a single delete command. In the event that the controllers receive the delete command from the data bus, each executes a specified delete routine by means of which the user data saved in the particular controller are overwritten and/or deleted. Another aspect therefore stipulates providing the delete routine in each of the controllers. Since each controller reacts to the delete command from the data bus and a delete routine is provided in each controller, it only has to be ensured in the motor vehicle that said trigger condition is satisfied and, as a consequence, the information about the user is deleted in the motor vehicle in each of the controllers by overwriting and/or deleting the user data. Within the context of the present exemplary aspect, user data may for example be: at least one telephone number, and/or at least one trip destination, and/or a sitting position, and or a mirror adjustment of a rearview mirror, and/or outside mirror, and/or trip route information in at least one driver assistance system. For example, it is provided that, by means of the method, all controllers that save data during operation of the motor vehicle, in particular user-specific and/or drive-specific user data, are controlled by the delete command and provide the corresponding delete routine.

The benefit of the teachings herein are that, by setting or instigating on the trigger condition in the motor vehicle, user data are deleted wherever they occur in the motor vehicle and/or are saved. By means of said overwriting of the user data, it may be ensured that a presence of the user data is concealed or hidden. By deleting the user data, it may at least be ensured that they may no longer be reconstructed.

In some embodiments, a factory state is restored by the delete routine in one, or some, or all of the controllers. In other words, in the particular data memory in which the user data are saved, a data state or data content is restored that existed upon delivery or ex-factory in the particular controller. This yields the benefit that the motor vehicle is in an as-delivered state, and therefore in addition, no indirect inferences are possible about the particular device state of the particular controller. The particular controller only contains the information that it receives directly after production and initialization at the manufacturer's.

In some embodiments, said trigger apparatus includes a control apparatus accessible or kept accessible for the user, and the trigger condition that is detected or checked by this trigger apparatus includes receiving a specified operation of the user through the control apparatus. In other words, the user must perform the specified operation on the control apparatus, whereby the triggering condition is then satisfied, i.e., the delete command is transmitted by the trigger apparatus to the data bus. Accordingly by executing the operation, a user may always ensure that the user data are deleted in the motor vehicle.

Several embodiments relate to the design of said control apparatus. In some embodiments, the control apparatus includes a mechanical switch, for example a pushbutton, or a control element of a graphical user interface, i.e., for example a menu entry of a control menu, or a touch or control surface. A graphical user interface (GUI) may for example be displayed or generated on a touchscreen of the motor vehicle. Some embodiments include a steering column switch of a steering wheel as the control apparatus. Such a steering column switch may be monitored or queried by a multifunctional display (i.e., an instrument cluster) in order to recognize a specified operation via the steering column switch, for example a specified movement sequence that the user performs with the steering column switch. Some embodiments provide that the control apparatus includes a control element that is assigned at least one control function different from triggering the delete command, i.e., may be actuated or serves to execute or trigger at least one different control function, and said specified operation includes a specified sequence of control steps by means of which the at least one control function remains untriggered. In other words, the control element may therefore be provided to trigger at least one control function in the motor vehicle. If however the specified sequence of control steps are performed on this control element, such as pressing three times and/or holding down once for a specified minimum time period, this does not trigger or activate the at least one control function; instead, the trigger condition is satisfied, whereby the delete command is therefore triggered or generated. This allows one and the same control element to be used both for at least one control function as well as to trigger the delete command. In some embodiments, the control apparatus includes an Internet portal for controlling the motor vehicle from an Internet access. In other words, the user may therefore trigger the delete command outside of the motor vehicle through the control portal. From the Internet portal, an Internet server may then for example trigger the delete command in the motor vehicle through an Internet connection. To accomplish this, the motor vehicle may be coupled to the Internet via a mobile radio connection and/or a WLAN connection (WLAN—wireless local area network). The use of an Internet portal has the particular benefit that the delete command may still be triggered afterward in the motor vehicle when the user may no longer reach the motor vehicle because, for example, he has already sold it or otherwise given it away.

In some embodiments, the trigger criterion includes that a specified length of use of the motor vehicle ends, and/or that there is an expiration of an authorization to use the motor vehicle signaled by a vehicle safety apparatus. The length of use may for example be saved in the trigger apparatus by saving for example length of use data. If the motor vehicle is for example rented as a rental vehicle, the rental period may be specified as the length of use. A vehicle safety apparatus may for example be provided such that authorization data of a vehicle key, in particular a digital vehicle key, are checked for their validity. If a vehicle key is invalid because for example the vehicle key is only approved for a specified length of use, and/or a block command for the use key has been received, the vehicle safety apparatus can, if the vehicle key is still being used, signal that the authorization for using the motor vehicle has expired, and all user data need to be correspondingly deleted. The vehicle safety apparatus may for example be provided by a motor vehicle locking system.

In some embodiments, the user data are each assigned to one of a plurality of specified safety levels. The trigger condition is also configured with levels, i.e., the trigger condition defines several different deletion levels that each indicate the safety level for which the delete routine should be performed. Each deletion level therefore indicates the safety level for which the delete routine should be performed. All user data of the user data selected by the deletion level are then deleted by the delete routine in the controllers, i.e., the user data of the associated safety level and each lower safety level. In other words, in the case that the trigger condition is satisfied, the trigger apparatus also determines the deletion level for which the trigger condition is satisfied. There may for example be a deletion level for leaving the motor vehicle so that the user data of this deletion level are deleted when the user only temporarily leaves the motor vehicle (for example after reaching the workplace or after reaching the apartment). A higher deletion level may be provided to delete user data because the trigger condition indicates that the user is leaving the motor vehicle for a specified longer time period, for example for a day or a week, and/or lends it to another person. Another higher deletion level may specify that the user is permanently giving away the motor vehicle, and all user data must therefore be deleted. Accordingly, a distinction may be made between different degrees of safety or degrees of urgency for deleting the user data.

In some embodiments, the delete command is transmitted several times. This may ensure that a controller that does not receive or does not process the first delete command, for example because the controller is restarted and/or the readiness for reception is delayed, still reliably receives the delete command.

In some embodiments, an acknowledgment message is transmitted on the data bus by each of the controllers if the delete command was received, and/or the delete routine was performed. The trigger apparatus or a specified computing unit uses acknowledgment messages received via the data bus and a list of the controllers to check whether each of the controllers has transmitted its acknowledgment message. When the acknowledgment message from at least one of the controllers is missing, an alert signal is output to the user.

Accordingly, the user beneficially receives a warning if not all controllers acknowledge the delete command and/or the execution of the delete routine. This informs the user that user data remain in the motor vehicle. The benefit of generating the acknowledgment message when the delete command is received is that it may be decided with a shorter delay whether all deletion devices have received the delete command. The benefits of triggering the acknowledgment message only after the delete routine has been performed is that the successful elimination of the user data is acknowledged by the acknowledgment message. The computing unit that may be provided to check the acknowledgment messages may for example be formed by the infotainment system of the motor vehicle. The computing unit may control the screen in order to display to a user an alert message to inform the user.

In some embodiments, at least one gateway of the data bus routes the delete command to several different bus branches. This yields the benefit that the same delete command may also be transmitted to controllers via different bus technologies, such as for CAN (controller area network) and ethernet and LIN (local interconnect network).

A second exemplary aspect concerns a motor vehicle with the plurality of controllers that are each configured to generate and save personal and/or drive-related user data while a motor vehicle is operating. The controllers are coupled to a trigger apparatus by a wired data bus. The data bus may be based on one or more bus technologies that may comprise at least one of the following bus technologies: CAN, Ethernet, LIN or MOST (media oriented systems transport). The trigger apparatus may for example be realized based on a controller, or an electronic circuit, or a combination of a plurality of controllers and/or electronic circuits. The trigger apparatus may for example provide a processor for checking the described trigger condition that is coupled to a data memory in which computer readable instructions are saved which, while being executed by the processor, check the trigger condition and cause the delete command to be generated. Overall, the controllers (with their delete routine) and the trigger apparatus in the motor vehicle are configured to execute one or more embodiments of the method according to the teachings herein. The controllers may realize the delete routine, for example based on a processor with a data memory coupled thereto, wherein computer-readable instructions may be saved in the data memory and, while being run by the processor of the controller, execute the delete routine, i.e., for example overwrite the user data with specified other data and/or delete the user data, in particular restore a factory setting. Moreover, the acceptance filters in the controllers that filter bus messages from the data bus may be expanded or adapted so that the acceptance filters receive the delete command from the data bus and forward it to the processor of the controller.

The motor vehicle according to the present aspect is for example designed as an automobile, in particular a passenger car or truck, or as a motorcycle.

In the following, further exemplary embodiments are described.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a motor vehicle 10 that may be a motor vehicle, in particular a passenger car or truck, or a bus, or a motorcycle. A data bus 11 may be provided in the motor vehicle 10 by means of which a plurality of controllers 12 may be coupled to a trigger apparatus 13. The data bus 11 may include a plurality of different data bus technologies (such as CAN, Ethernet, LIN and/or MOST) that may be coupled via a gateway 14. The ellipses in FIG. 1 symbolize that the data bus 11 may comprise more than the shown controllers, or also less.

In the controllers 12, user data 15 may be generated and saved by the controllers 12 themselves during operation of the motor vehicle 10. For example, a controller 12 may be a media playback device that may save playlists and/or wish lists of a user. A controller 12 may be a driver assistance system that saves route data as user data 15 for travel routes that are covered regularly or repeatedly by the motor vehicle 10. A controller 12 may be provided for telephonic use, and may save for example telephone numbers and/or a digital address book as user data 15. These are only examples of possible controllers 12 that may generate and save user data 15. The user data 15 may be personal and/or drive-related.

The motor vehicle 10 allows a user to independently ensure that the user data 15 are deleted without a workshop visit. He may trigger or perform this himself without a workshop visit. The trigger apparatus 13 that may monitor a trigger condition 16 is provided to do this. If the trigger condition 16 is satisfied, the trigger apparatus 13 may transmit a delete command 17 via the data bus 11 to all controllers 12. A delete routine 18 may be provided in the controllers 12 that is executed by the particular controller 12 if the delete command 17 is received via the data bus 11. The deletion and/or overwriting of the user data 15 is instigated by the delete routine 18 while it is being executed in the controllers 12. When an individual trigger condition 16 is satisfied, this may ensure that all saved user data 15 are deleted in the controllers 12 in the entire motor vehicle 10. To accomplish this, the delete routine 18 may for example provide that the particular controller 12 is reset to a factory state or delivery state.

Figure 2:
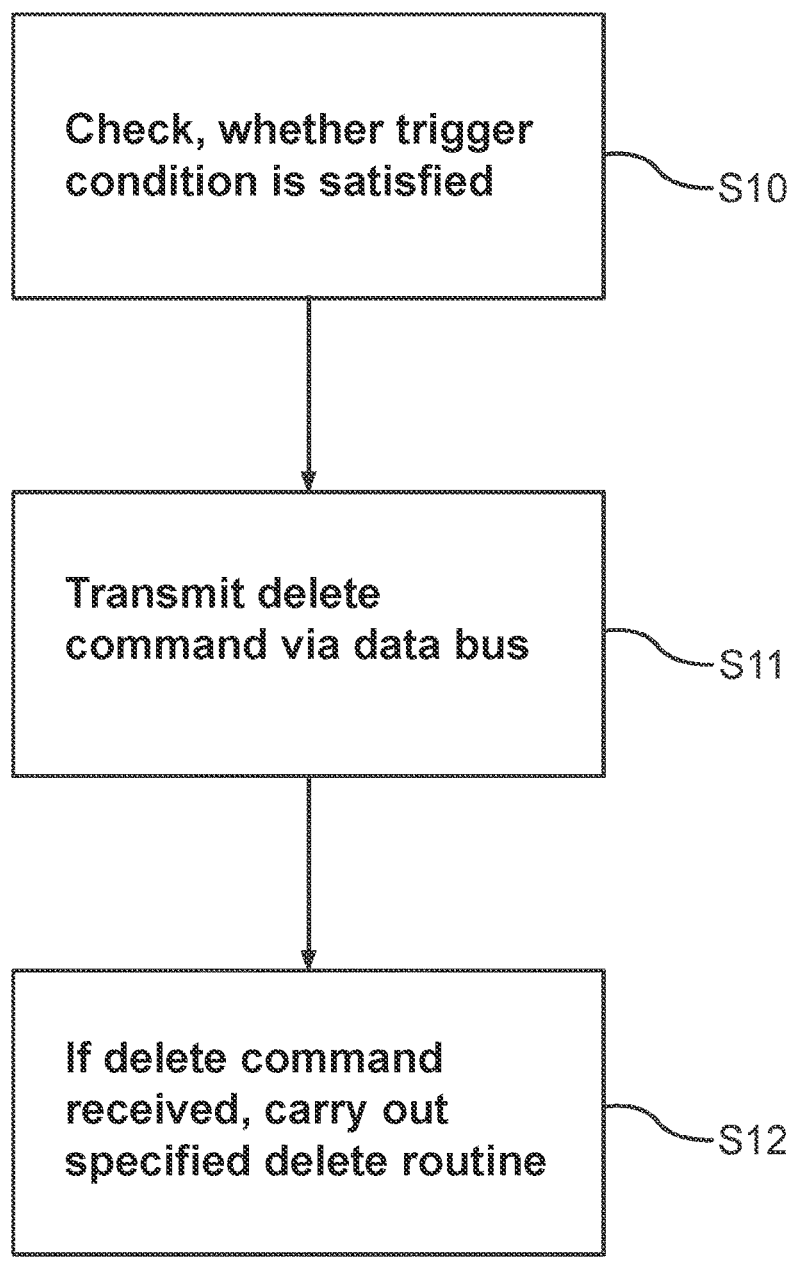
FIG. 2 shows a flow chart to illustrate an embodiment of a method.

FIG. 2 illustrates in this regard a potential method as may be performed in the motor vehicle 10 by the controllers 12 and the trigger apparatus 13. In a step S10, the trigger apparatus may check whether the trigger condition 16 is satisfied. If the trigger condition 16 is satisfied, a delete command 17 that applies to all controllers 12 may be transmitted in a step S11 via the data bus 11 of the motor vehicle 10. In the event that the controllers 12 receive the delete command 17 from the data bus 11 in a step S12, each carries out a specified delete routine 18 by means of which the user data 15 saved in the particular controller 12 are deleted and/or overwritten.

The basic concept therefore provide that a central delete command is generated which may be sent to all vehicle networks by a controller that represents the trigger apparatus. Accordingly without a detailed knowledge of the saved personal user data, said data may be deleted in a decentralized manner in each controller (storage location).

The delete command is for personal data. Accordingly, it may be provided that a diagnostic interface for the data bus (such as the gateway) transmits the central delete command 17 for all personal user data to all controllers after a specified operation or due to a previously established trigger event.

The corresponding delete command 17 is for example a component of an already existing cyclical message (for example a bit that has been actively set 10 times) that is sent to all vehicle networks (CAN, FlexRay, Ethernet), which is represented in FIG. 1 by the data bus 11. The position of the signals may be seen in the corresponding data definition.

A controller 12 in which personal user data 15 are saved deletes them independently after receiving the delete command 17 without sending a confirmation; however, the receipt of the message is for example acknowledged by an acknowledgment message 19.

The currently set configuration is not changed by the receipt of a delete command according to one embodiment. That is, only user data are changed, but not configuration or setting data.

The generation of the delete command 17 may be provided as follows. A delete command 17 for personal user data is for example only accepted given "terminal 15 on" (ignition on). The delete command 17 is for example sent 30 seconds at the earliest after switching on "terminal 15" so that the receivers are active. To activate the delete command, the following versions are available depending on the vehicle version:

a) Explicit Operation:

An operation specially designed for this (simultaneous pressing of different buttons or separate button) is interpreted as a central delete command for personal data and sent by the gateway to all networks.

b) Menu Entry:

A new menu entry to be defined in MIB/HMI contains a selection menu for deleting personal data that the customer may activate by a checkbox. After this checkbox is selected, the delete command is transmitted.

c) Automatic Deletion:

After the length of use is over (such as authorized rental car use), the personal data are automatically deleted. For this purpose, the gateway is informed by the driving authorization, or respectively access authorization about the end of the length of use.

d) Diagnostic Command:

A "RESET state" defined in the diagnosis and communicated to the controller by diagnostic commands causes the personal data to be deleted. In vehicles with an onboard tester functionality, this command is also sent by the onboard tester.

A potential signal assignment for a bus message may look as follows (realization proposal of a message assignment):

| Message: | Systeminfo_01 |
| --- | --- |
| Identifier [hexadecimal]: | 0x585 |
| Identifier [decimal]: | 1413 |

-continued

| | |
| --- | --- |
| Protocol: | Classical/FD |
| Message length: | 8 |
| Cycle time normal [ms]: | 1,000 |
| Cycle time fast [ms]: | [empty] |
| Inhibit time [ms]: | 10 |
| StartDelay [ms]: | 0 |
| Message type: | Application |
| GenMsgSendType: | cyclic |
| GenMsgNrOfRepetition: | [empty] |
| Signal: | SI_xxx |
| StartByte: | 4 |
| StartBit: | 7 |

The solution first requires the presence of a data network in the vehicle that for example is realized by CAN, Ethernet or LIN. A delete command that represents a bus message or a date that is sent on the entire bus system and is received by all controllers causes all controllers to be reset to the delivery state, i.e., all data that are saved after delivery to the buyer such as telephone numbers, trip destinations, sitting positions (memory seat), mirror settings (memory function) are reset to the delivery state. Currently, resetting to factory settings in the infotainment system only works in the central computer of the infotainment controller. Triggering a central delete command by a workshop tester is associated with a visit to the workshop. However, it should be ensured that all controllers of the vehicle are reset to the factory state with a single operation in the vehicle. To this end, either the central computer may be expanded so that it sends a command to a data bus that causes resetting in all controllers once the menu point is called. Another option is to incorporate such a command in the multifunctional display (onboard computer) and scroll through the menu of the multifunctional display and select this command there by the control elements provided for this purpose such as a steering column switch or steering wheel switch. This then causes the delete command 17 to be sent by the onboard computer to all bus systems and to correspondingly reset all controllers. Another embodiment would be a control point created for this purpose such as a pushbutton whose position is read out by a controller of the network and that also causes the resetting command to be sent.

The following elements may be necessary for this:
1. The definition of the resetting command to the bus system
2. The acceptance filter for all controllers must receive this command and delete the required data by means of a suitable software routine.
3. Any existing gateway controller must route through this command to all bus systems
4. Incorporate a control point When the delete command is triggered, for example by the driver, individual controllers do not have to be selected. A central operation triggers a deletion (resetting to the factory state) of all personal data in all controllers.

A defined operation or a menu item in the central display or in the infotainment system triggers the delete command. Automatic deletion after the end of use is also possible.

The deletion process may be independently triggered by the vehicle user.

Overall, the example shows how a global (vehicle-wide) resetting of all data memories with personal content to a factory setting may be provided by using the teachings herein.

LIST OF REFERENCE NUMERALS

10 Motor vehicle
11 Data bus

12 Controller
13 Trigger apparatus
14 Gateway
15 User data
16 Trigger condition
17 Delete command
18 Delete routine
19 Acknowledgment message The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for removing one or more of user-specific and drive-specific user data which are saved on a plurality of controllers in a motor vehicle, comprising:
   detecting a digital vehicle key signal from a vehicle key configured to unlock the motor vehicle;
   automatically detecting a particular trigger condition, from a plurality of different trigger conditions, based on the detected digital vehicle key signal;
   automatically determining a particular trigger condition level, from a plurality of different trigger condition levels having different associated delete routines, and automatically identifying a particular delete routine associated with the particular trigger condition level, the particular delete routine specifying particular user data to be overwritten or deleted from one or more of the plurality of controllers;
   in response to detecting the particular trigger condition and identifying the particular data deletion routine associated with the particular trigger condition level, transmitting a specified common delete command to the one or more controllers of the motor vehicle via a data bus of the motor vehicle; and
   executing the particular delete routine to overwrite or delete the particular user data saved in the one or more controller.

2. The method of claim 1, wherein a factory state is restored by the delete routine in one or more controllers of the plurality of controllers.

3. The method of claim 1, comprising detecting the particular trigger condition using a trigger apparatus, which trigger apparatus comprises a user interface that is accessible for a user, and the particular trigger condition comprises receiving a specified operation of the user through the user interface.

4. The method of claim 3, wherein the user interface comprises one or more of: a mechanical switch, a control element of a graphical user interface, a steering column switch of a steering wheel that is operated by a multifunctional display, a control element that is assigned at least one control function different from triggering the delete command and the operation includes a predetermined sequence of control steps using which the at least one control function remains untriggered, and an Internet portal for operating a motor vehicle via the Internet.

5. The method of claim 1, wherein the particular trigger condition comprises that a predetermined length of use of the motor vehicle ends, and/or that there is an expiration of an authorization to use the motor vehicle.

6. The method of claim 1, wherein the user data are assigned to one of a plurality of specified safety levels, each safety level associated with a respective delete routine for deleting selected user data associated with the respective safety level.

7. The method of claim 1, wherein the delete command is transmitted repeatedly.

8. The method of claim 1, wherein an acknowledgment message is transmitted on the data bus by each controller of the plurality of controllers if the delete command was received, and/or the particular delete routine was performed, and a trigger apparatus or a specified computing unit uses acknowledgment messages received from the data bus and a list of controllers to check whether each of the controllers has transmitted an acknowledgment message, and when the acknowledgment message from at least one of the controllers is missing, an alert signal is output to the user.

9. A motor vehicle, having:
   a trigger apparatus;
   a plurality of controllers that are each configured to generate and save one or more of personal and drive-related user data of a user while the motor vehicle is operating, wherein the plurality of controllers are coupled to the trigger apparatus by a wired data bus; and
   at least one gateway, configured for routing commands to several different bus branches of different bus technologies;
   a memory storing:
      multiple deletion levels, each corresponding with a different expected future relationship between the user and the motor vehicle, each deletion level defining a respective deletion routine that specifies respective user data to be deleted from one or more of the plurality of controllers;
      multiple trigger condition levels, each trigger condition level indicating a respective one of the multiple deletion levels;
   wherein the motor vehicle is configured for:
      using the trigger apparatus, determining whether a trigger condition has been satisfied, and determining a trigger condition level of the determined trigger condition from the multiple different trigger condition levels;
      in response to determining the trigger condition level of the trigger condition, identifying the deletion routine of the deletion level corresponding with the determined trigger condition level; and
      executing the identified deletion routine, including transmitting a specified common delete command to one or more of the plurality of controllers of the motor vehicle via the data bus of the motor vehicle to delete or overwrite the respective user data specified by the identified deletion routine corresponding with the determined trigger condition level.

10. The method of claim 2, comprising detecting the particular trigger condition using a trigger apparatus, which trigger apparatus comprises a user interface that is accessible for a user, and the trigger condition comprises receiving a specified operation of the user through the user interface.

11. The method of claim 10, wherein the user interface comprises one or more of: a mechanical switch, a control element of a graphical user interface, a steering column switch of a steering wheel that is operated by a multifunctional display, a control element that is assigned at least one control function different from triggering the delete command and the operation includes a predetermined sequence of control steps using which the at least one control function remains untriggered, and an Internet portal for operating a motor vehicle via the Internet.

12. The method of claim 2, wherein the particular trigger condition comprises that a predetermined length of use of the motor vehicle ends, and/or that there is an expiration of an authorization to use the motor vehicle.

13. The method of claim 3, wherein the particular trigger condition comprises that a predetermined length of use of the motor vehicle ends, and/or that there is an expiration of an authorization to use the motor vehicle.

14. The method of claim 2, wherein the user data are assigned to one of a plurality of specified safety levels, each safety level associated with a respective delete routine for deleting selected user data associated with the respective safety level.

15. The method of claim 3, wherein the user data are assigned to one of a plurality of specified safety levels, each safety level associated with a respective delete routine for deleting selected user data associated with the respective safety level.

16. The method of claim 2, wherein the delete command is transmitted repeatedly.

17. The method of claim 1, wherein automatically detecting the particular trigger condition based on the detected digital vehicle key signal comprises detecting the key has been disabled.

18. The method of claim 1, wherein automatically detecting the particular trigger condition based on the detected digital vehicle key signal comprises detecting a block command associated with the vehicle key.

19. The motor vehicle of claim 9, wherein the different deletion levels correspond with an expected duration of a user being away from the motor vehicle.

20. The method of claim 1, wherein at least one gateway of the data bus routes the delete command to several different bus branches of different bus technologies.

* * * * *